US005082301A

United States Patent [19]

Schumacher et al.

[11] Patent Number: 5,082,301

[45] Date of Patent: Jan. 21, 1992

[54] MOBILE WORK STATION FOR PAINTER

[75] Inventors: Kevin H. Schumacher, 317 Bustleton Ave., Apt. C, Feasterville, Pa. 19053; Robert J. Martin; Edward L. Martin, both of Hampstead, Md.

[73] Assignee: Kevin H. Schumacher, Feasterville, Pa.

[21] Appl. No.: 601,226

[22] Filed: Oct. 22, 1990

Related U.S. Application Data

[63] Continuation of Ser. No. 371,032, Jun. 26, 1989, Pat. No. 4,993,726.

[51] Int. Cl.[5] .......... B62B 3/00

[52] U.S. Cl. .......... 280/38; 15/257.06

[58] Field of Search .......... 108/25, 26, 125, 129; 118/506; 401/15, 48; 15/257.05, 257.06; 280/35, 38, 651, 43, 47.35, 79.2, 641, 39

[56] References Cited

U.S. PATENT DOCUMENTS

| | | | |
|---|---|---|---|
| D. 302,618 | 8/1989 | Gottselig | D34/23 |
| 1,901,732 | 3/1933 | Clark | 108/125 |
| 2,575,846 | 11/1951 | Singer | 280/47.34 |
| 3,156,510 | 11/1964 | Hindin et al. | 108/125 X |
| 3,220,773 | 11/1965 | Burns | 280/79.2 X |
| 4,325,323 | 4/1982 | Rioux | 401/15 X |
| 4,404,704 | 9/1983 | Rabban | 15/1 X |

*Primary Examiner*—Andres Kashnikow
*Assistant Examiner*—Michael Mar
*Attorney, Agent, or Firm*—Leonard Bloom

[57] ABSTRACT

A mobile work station for a painter or the like comprising a tray to hold paint containers and tools, four legs with wheels and a handle. The tray may be divided into compartments to more securely hold the paint containers. The legs are pivotally mounted and may swivel through 270° for storage in the tray for ease of storage and transport. The legs may be secured in the depending and in the stored positions. A removable shelf may be attached to the work station to hold accessory equipment, tools and personal items. A carrying strap is provided to facilitate transport of the work station.

2 Claims, 6 Drawing Sheets

MOBILE WORK STATION FOR PAINTER

This application is a continuation of application Ser. No. 371,032, filed June 26, 1989, now U.S. Pat. No. 4,993,726.

FIELD OF THE INVENTION

The present invention relates to a work station for use by painters and the like, more particularly to a tray having foldable legs with wheels and further having a compartmentalized tray to hold containers of paint and for the storage of paint equipment, tools and sundry items.

BACKGROUND OF THE INVENTION

In the process of painting, the painter, whether a professional paint contractor or a home owner, places the container of paint on a surface and dips the brush or paint roller into the container. Since the container is bulky and prone to spilling, thereby causing damage and requiring much time wasted in clean up, the paint container is moved infrequently. This necessitates constant travel by the painter from the work area to the paint container, which is tiring and inefficient. Also, the paint container is usually placed on the floor to reduce the possibility of spillage. This location is inconvenient for the painter who must bend over to apply paint to the brush or roller. An alternative is for the painter to hold the paint container in one hand and paint with the other. This has the obvious disadvantages of restricting the painter's movement and being extremely tiring. Furthermore, the painter's accessory tools and equipment (sandpaper, wipes, tape, spackle, etc.) and personal items (beverage, cigarettes, ash tray, etc.) are not located near the work area and the painter must leave the work area to get these materials.

The only prior art of which the applicant is aware which is directed to a movable paint stand is U.S. Pat. No. 2,580,623 issued to Wahl in which there is disclosed a stand to support a paint pail, the stand being mounted on a carriage having rollers.

U.S. Pat. No. 2,290,450 issued to Renschin discloses a telescoping tube to support a horizontal rod. The rod takes the place of a man in holding paper to be applied to a ceiling so that a single person can perform the papering. The horizontal rod can be replaced by a pan to hold a bucket of paint to facilitate dipping a brush in the paint when painting a ceiling.

Also of interest to the present invention are the following:

| Inventor(s) | U.S. Pat. No. |
|---|---|
| Conger | 2,284,801 |
| Hotton | 2,981,549 |
| Shackel | 3,170,709 |
| Swick, Jr. | 3,759,599 |
| Hines | 4,119,044 |
| Schreiner | 4,363,496 |
| Remington et al | 4,535,897 |
| Teachout | 4,537,421 |
| Cunningham | 4,679,805 |
| Betts et al | 4,690,417 |
| Liegel | 4,715,573 |
| Coote | 4,728,065 |
| Grow | D 183,425 |
| Corini | D 230,257 |
| Salsgiver | D 232,166 |
| Daventry | D 271,733 |
| Luyk et al | D 289,459 |
| Bettress | D 296,143. |

These references disclose a variety of movable carts and tool stands. However, there is no suggestion that these be used for paint or paint equipment.

Accordingly, it can be seen that there exists a need for a device for use by painters which can be easily moved to the immediate work area, which holds the paint container at a convenient height so the container is less liable to be spilled, which also holds tools, accessory equipment and personal items, and which may be folded for ease of storage and transport.

SUMMARY OF THE INVENTION

A principle object of the present invention is to alleviate the deficiencies of the prior art by providing a mobile work station for the painter which holds a paint container, tools and accessory equipment.

It is another object of the present invention to provide a mobile work station, such as is described above, which is work effective and reduces travel of the painter between the work area and the paint container.

It is a further object of the present invention to provide a mobile work station which is at a convenient height to be less tiring to the painter.

It is yet another object of the invention to provide a mobile work station which is compact and may be easily stored and transported.

In accordance with the teachings of the present invention, there is disclosed a mobile work station for a painter or the like wherein the work station is relatively lightweight and collapsible to facilitate transport and storage. The work station comprises a tray having side walls to form an open top whereby a paint roller, pan, brushes and the like may be disposed in the tray and moved about by the painter on the job. The work station also has a plurality of legs, each leg having a first end and a second end. The first end of each leg is mounted on the tray and is capable of being pivoted such that each leg has a first position in which the leg is adjacent to the tray and such that each leg has a second position in which the leg depends downwardly. The work station has means for securing each leg in both the first and second position.

Preferably, the tray is substantially rectangular and has four side walls. Preferably, the work station has four legs and each leg is capable of pivoting substantially 270°. In this manner each leg has a first position in which the leg is stored in the open top of the tray. Also, casters are carried by the second end of each leg thereby facilitating the movement of the work station on the job. Further, the work station has a handle connected to the tray to facilitate movement of the work station. The work station further comprises at least one divider in the rectangular tray forming at least two compartment therein for storage of paint containers, tools, personal items and the like. Preferably, at least one compartment of the tray has a mesh-like structure.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practive of the invention. Accordingly, the drawings and descriptions will be regarded as illustrative in nature and not as restrictive.

BRIEF DESCRIPTION OF THE PREFERRED EMBODIMENTS

Figures 1, 2, 4:
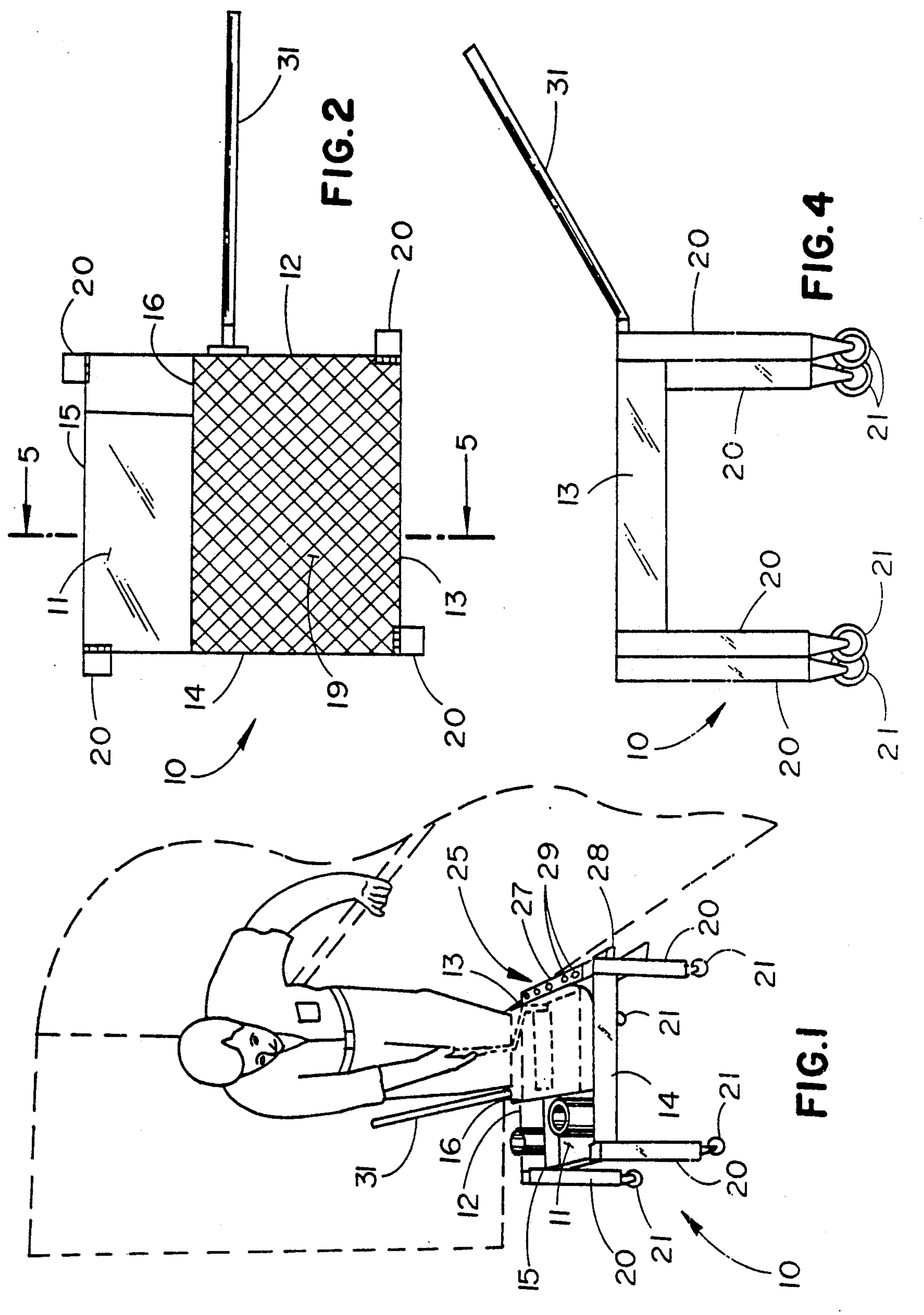
FIG. 1 is a perspective view of the device of the present invention showing it during use thereof (including a removable shelf).
FIG. 2 is a top plan view of the device.
FIG. 4 is a side view of the device.

With reference to FIGS. 1–5, there is illustrated a mobile work station 10 for a painter or the like. The device has a rectangular tray 11 with side walls 12, 13, 14, 15 to form an open top receptacle. One or more dividers 16 are disposed within the tray to form compartments therein. The compartments are of dimensions such that equipment, such as a painter's pan for use with a paint roller applicator or a one (1) gallon can of paint, can be easily and securely placed in the compartment. Also, the compartment may be used for accessory equipment (such as sandpaper, wipes, paint brushes, tape, etc.) or for personal items (beverage, cigarettes, ash tray, etc.). As shown in FIG. 2, the tray may have a continuous surface, it may be a mesh-like surface or it may be continuous in one compartment and mesh-like 19 in another. For example, the compartment in which the pan for use with a roller applicator is preferably mesh-like 19 because there is a greater probability of paint spilling in this compartment and the mesh-like structure is less difficult to clean. Furthermore, the mesh-like structure reduces the total weight of the work station.

Figure 6A:
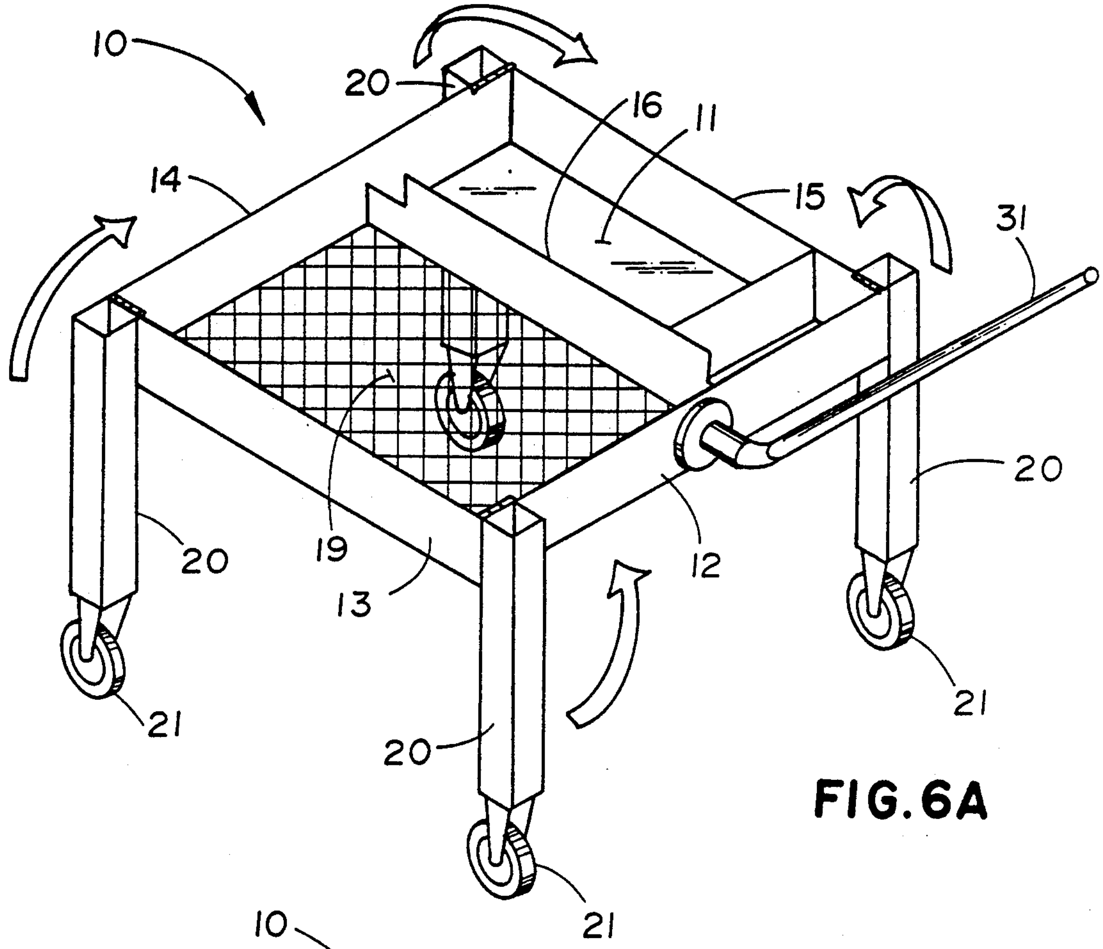
FIG. 6A is a perspective view of the device showing the legs in a depending position and showing the pivotal movement of the legs through 270° to a stored position.
Figure 6B:
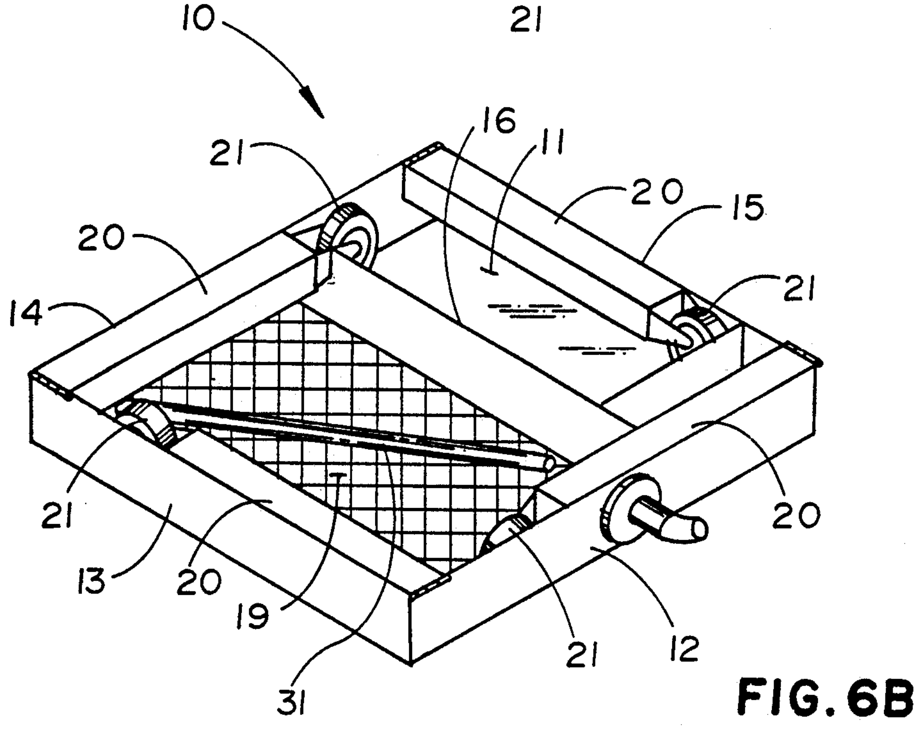
FIG. 6B is a perspective view of the device showing the legs in the stored position in the open top of the tray.
Figure 9:
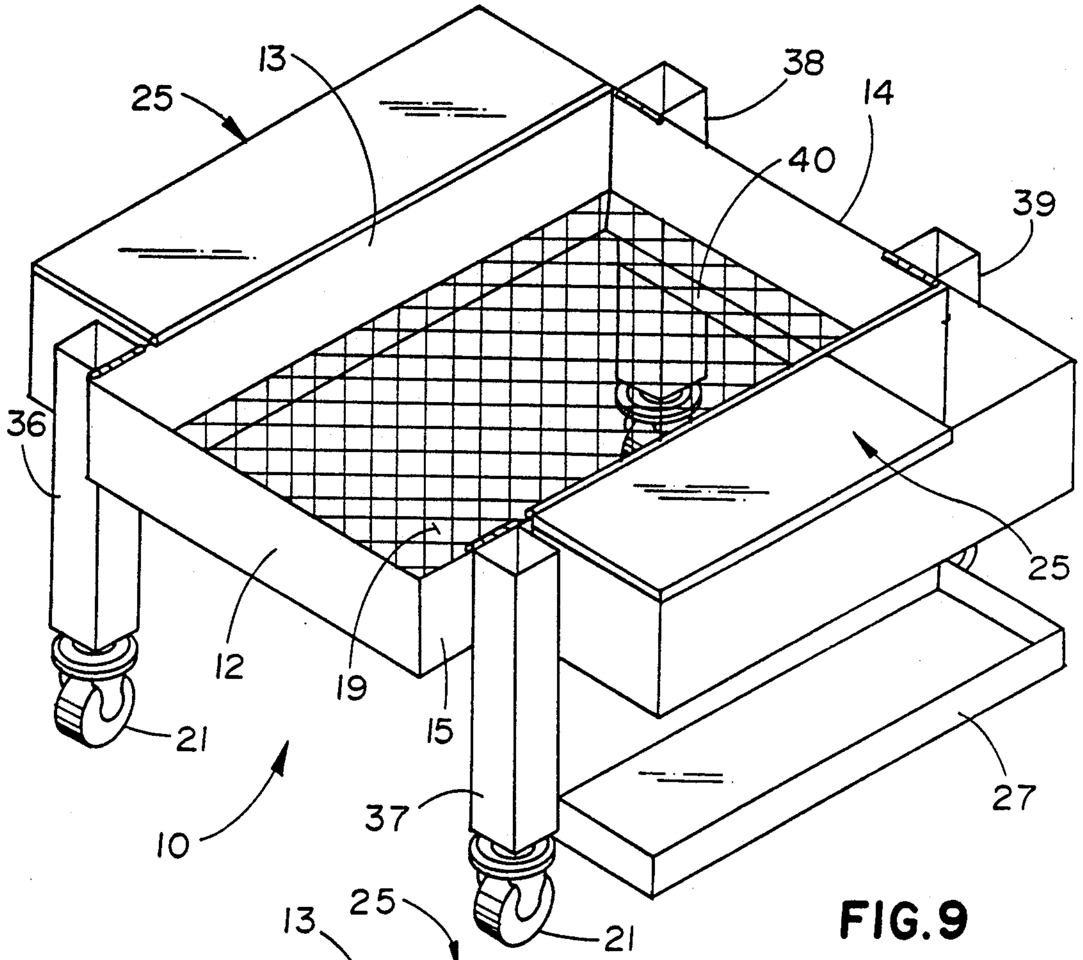
FIG. 9 is a perspective view of another embodiment of the device of the present invention.
Figure 10:
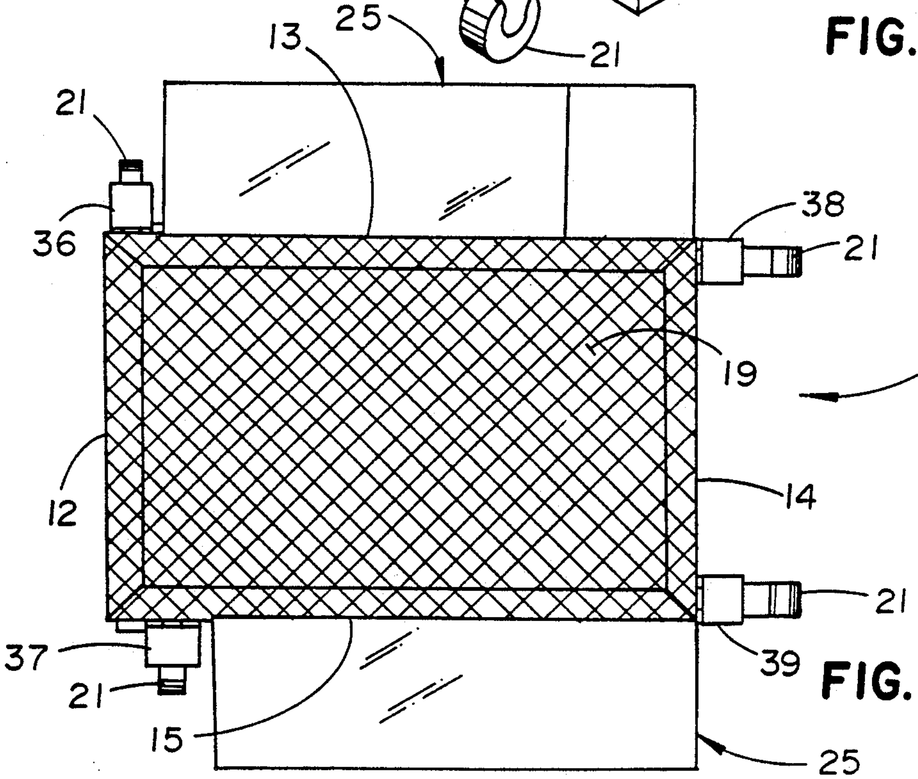
FIG. 10 is a top view of the device of FIG. 9.
Figure 11:
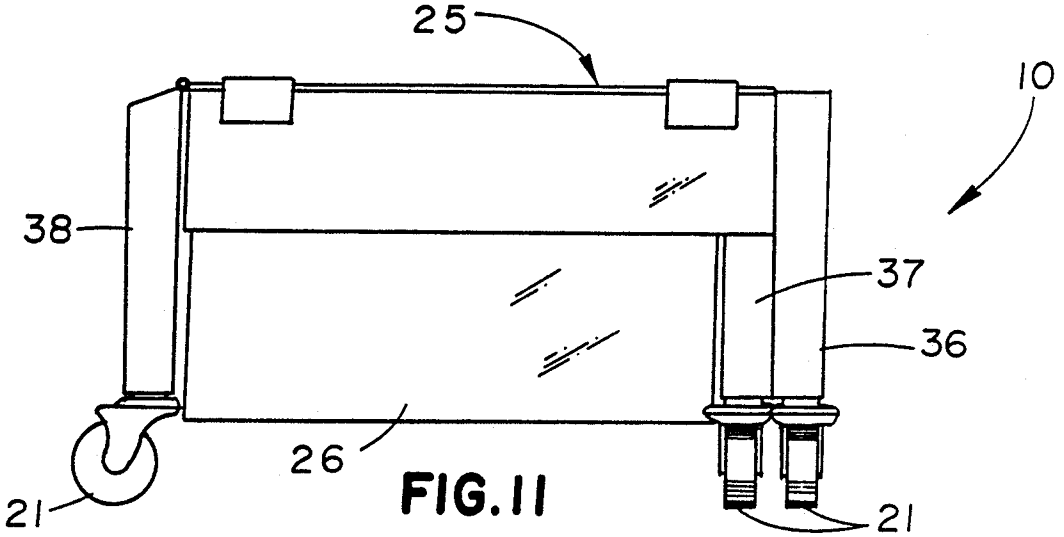
FIG. 11 is a side view of the device of FIG. 9.
Figure 12:
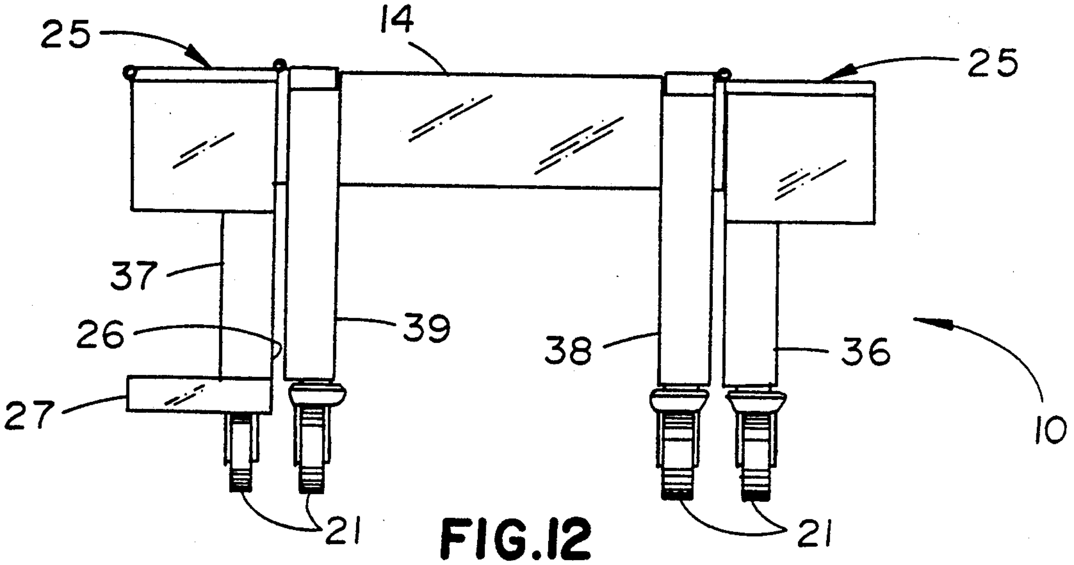
FIG. 12 is an end view of the device of FIG. 9.

The work station has four legs 20, each leg having a first end and a second end. The first end of each leg is pivotally mounted on the tray 11. As shown in FIG. 6A, the legs may pivot through 270° to a first position in which the leg 20 is adjacent to the tray 11 and is stored in the open top of the tray 11. The legs in the stored position are shown in FIG. 6B. The legs 20 also have a second position in which the legs 20 depend downwardly from the tray 11 to support the tray 11. Means are provided to secure the legs 20 in both first and second positions so the legs may be secure in the collapsed or working position respectively.

Preferably, the leg height is approximately 13 in. to 18 in. as being most convenient with respect to reducing bending by the painter and obtaining a stable work station 10.

Casters 21 are carried by the second end of each leg 20 to enable the work station 10 to be easily rolled over a surface to facilitate movement of the work station and reduce movement and travel by the painter.

A handle 31 is also provided which may be removable or may otherwise be foldable to allow easy transport and storage. The handle 31 may be a painter's "shorty pole" which may be threadably connected with a complementary threaded fitting on the work station 10. The handle allows the painter to easily pull or push the work station 10 safely as the painter progresses from one work area to another work area. In addition, a deeper paint pan capable of holding more paint may be used without the risk of back injury to the painter or spillage of the paint.

A removable shelf 25 may also be provided as a receptacle for painter's tools and sundry items. The shelf has a back 26, at least one shelf 27, sides 28 and means for removably attaching the shelf 25 to the work station 10. If desired, the shelf may have a hinged or removable cover.

Figure 8:
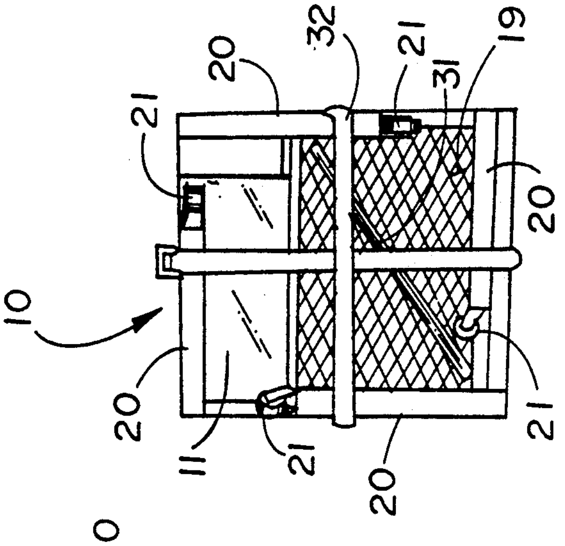
FIG. 8 is a perspective view of the device with the carrying strap disposed thereon.
Figure 7:
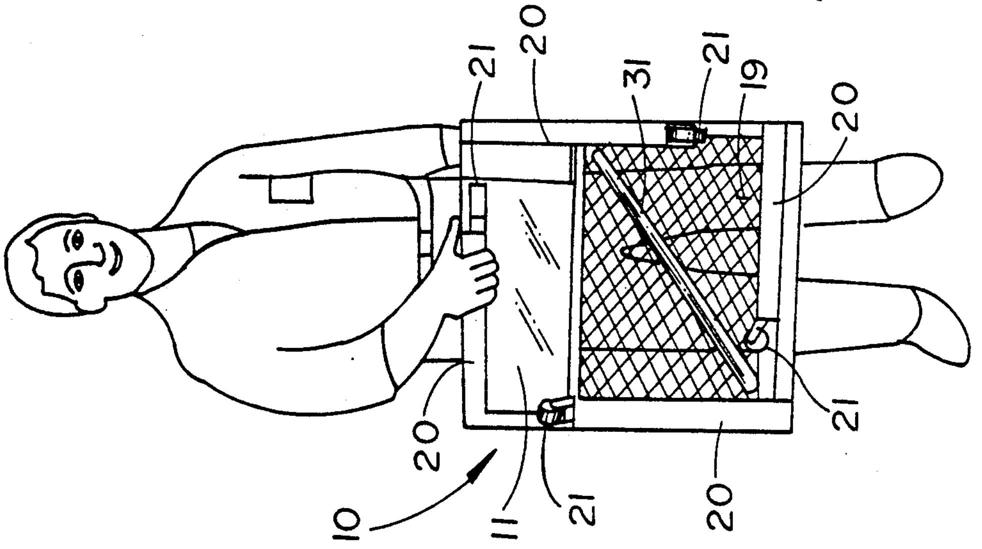
FIG. 7 is a perspective view showing a person holding the device in which the legs have been folded to the stored position.
Figure 3:
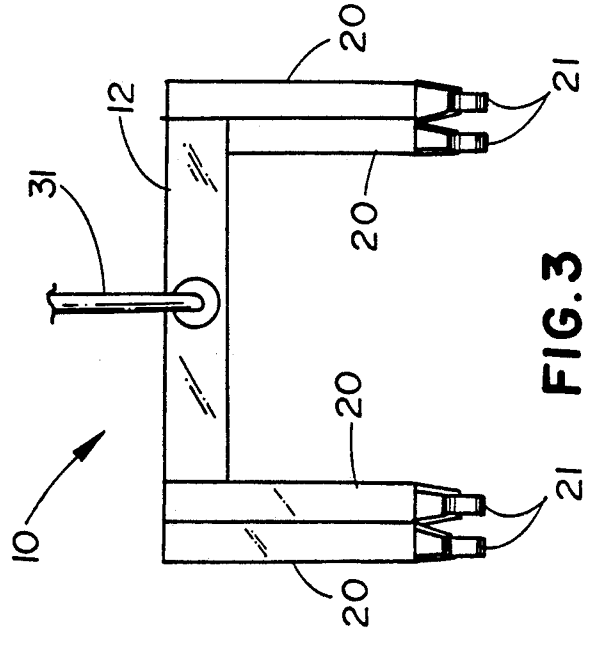
FIG. 3 is an end view of the device.
Figure 5:
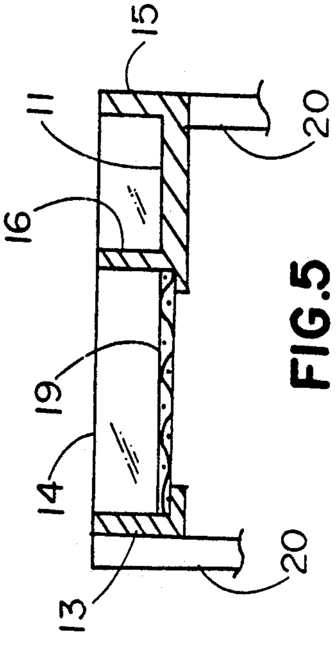
FIG. 5 is a cross-sectional view taken across the lines 5—5 of FIG. 2 in which the thickness has been exaggerated.

As shown in FIG. 7, the work station 10 is relatively lightweight and is easily carried by a person in the collapsed position. The handle 31 may be conveniently placed across one of the compartments of the tray 11. A carrying strap 32 may be removably disposed about the tray 11 with the legs 20 in the first position adjacent to the inside of the tray 11, as in FIG. 8.

Figure 13:
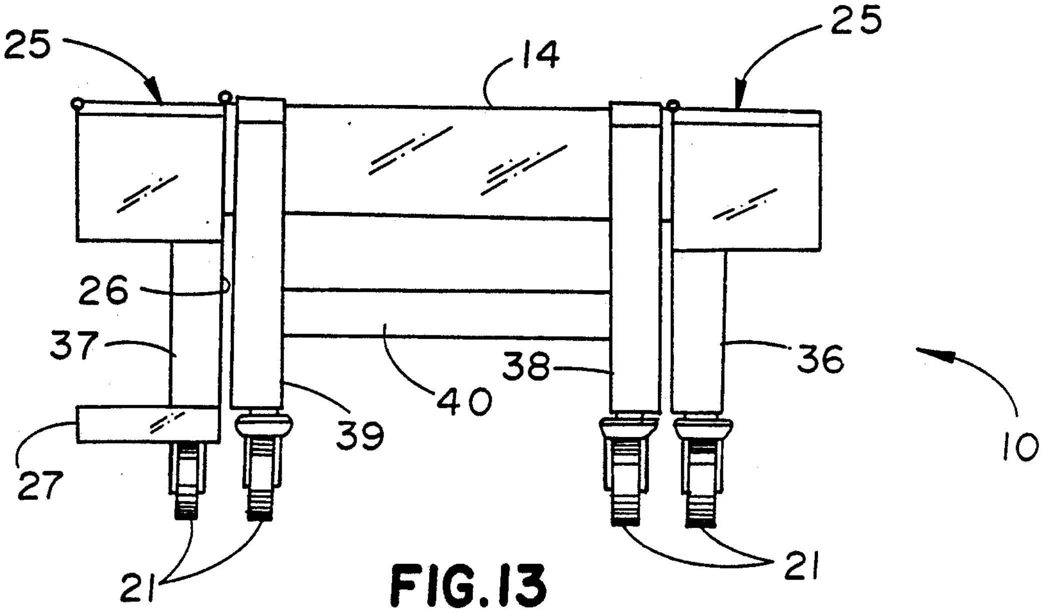
FIG. 13 is an end view of the device of FIG. 9 in which a transverse bar connects two legs.
Figure 14A:
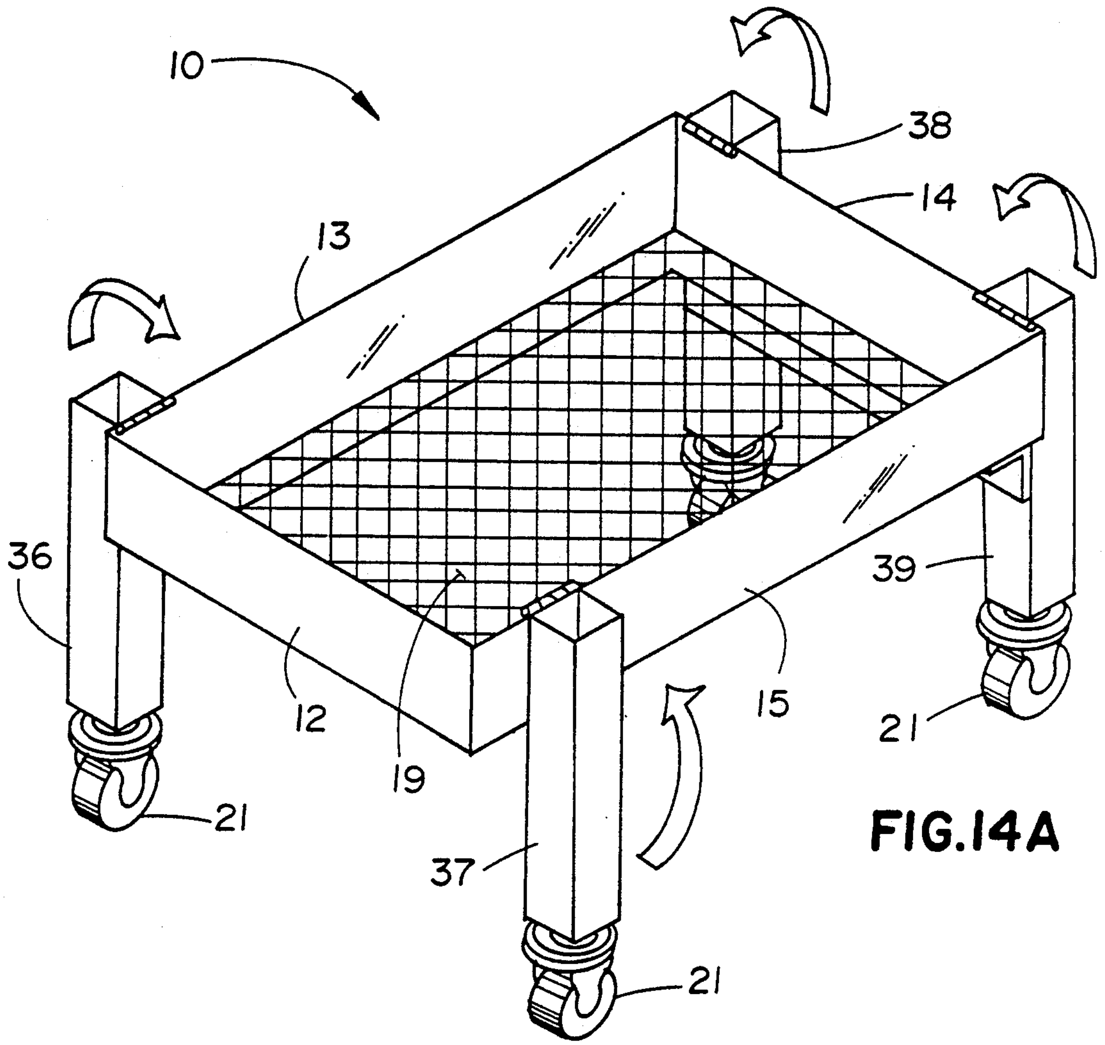
FIG. 14A is a perspective view of the device of FIG. 9 showing the legs in a depending position and showing the pivotal movement of the legs through 270° to a stored position.
Figure 14B:
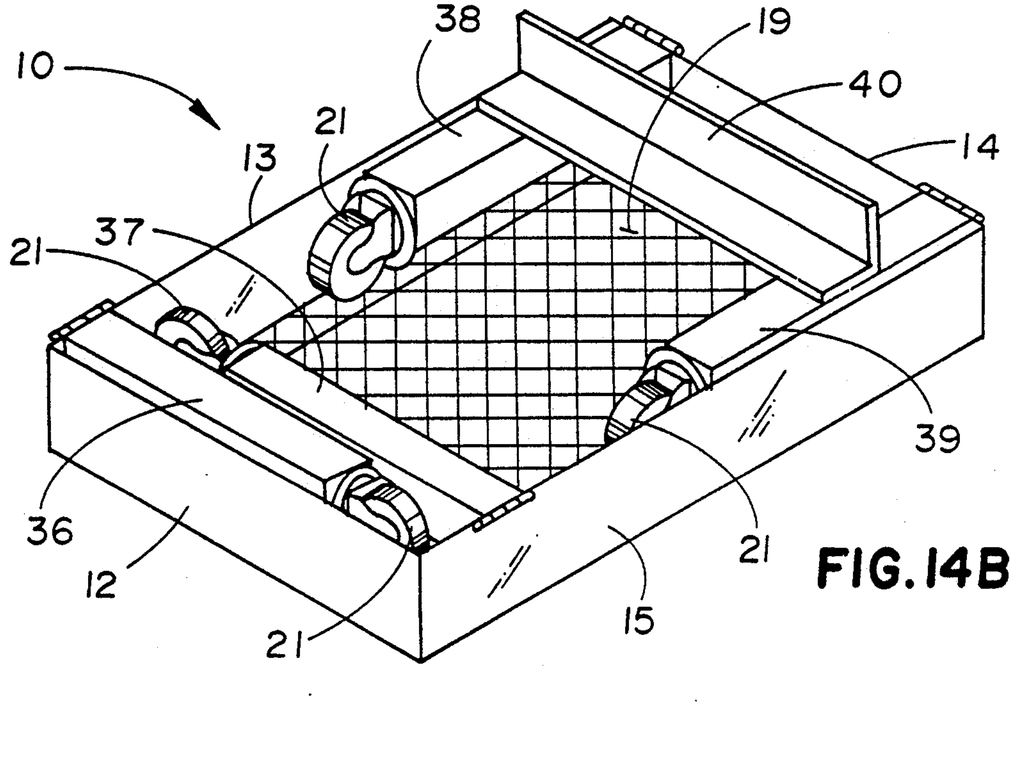
FIG. 14B is a perspective view of the device of FIG. 9 showing the legs in the stored position in the open top of the tray.

FIGS. 9–14B show an alternate embodiment of the work station 10 in which one leg 36 is pivotally mounted on the second side wall 13 substantially at the corner of the second side wall 13 and the first side wall 12. A second leg 37 is pivotally mounted on the fourth side wall 15 near the first side wall 12. The third leg 38 and fourth leg 39 are pivotally mounted on the third side wall 14; the third leg 38 is near the second side wall 13 and the fourth leg 39 is near the fourth side wall 15. The legs 36–39 are capable of pivoting substantially 270° (FIG. 14A) such that the legs 36–39 have a first position in which the legs 36–39 are stored in the open top of the tray 11 and such that the legs 36–39 have a second position in which each leg 36–39 depends downwardly from the tray 11 and supports the tray 11. In the stored position, the first leg 36 is disposed adjacent to the second leg 37 as shown in FIG. 14B.

As shown in FIGS. 13, 14A and 14B, leg 38 and leg 39 may be connected by a transverse bar 40 therebetween so that both legs 38, 39 are moved simultaneously between the first stored position and the second supporting position.

The alternate embodiment may also have compartments and removable shelves.

Accordingly, it will be appreciated that the present invention readily achieves its objectives. The work station is mobile, provides a convenient means for holding paint, accessory equipment, tools and personal items, is relatively lightweight and easily transported and stored. It will be appreciated that, although use by painters has been identified, other workmen and homeowners will find the mobile work station of great utility for general movement of equipment, tools and other materials. Also, it will be appreciated that the work station may be rectangular or have other configurations adaptable to specific purposes.

Also, it will be appreciated that although the figures show a work station having four (4) legs, other configurations may be stably supported with other than four (4) legs.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method of painting on work surfaces, wherein a painter on a job site uses a roller paint applicator and a paint pan or the like, the paint pan having a shallow end and a deep end, the method comprising the steps of: providing a collapsible, portable, relatively light weight mobile work station which may be carried to the job site, the mobile work station having a length and including an open recessed tray having a front wall adjacent to where the painter normally stands and further having a back wall, the front and back walls being transverse to the length of the mobile work station, the tray having a divider wall running along the length of the mobile work station between the front wall and the back wall of the tray thereof, thereby dividing the tray into at least a first large compartment running along the length of the mobile work station, the mobile work station further including a plurality of pivotable legs, such that the legs have a first storage position adjacent to the tray in the collapsed position of the mobile work station, and such that the legs have a second extended position in which the legs depend downwardly to support the tray at a convenient height above the floor so that the painter may apply paint to the paint applicator without repeatedly deep bending, thereby reducing painter fatigue; carrying the mobile work station to the job site, pivoting the legs from the first storage position to the second extended position and securing the legs in the extended position such that the mobile work station is in an erected position, the legs of the mobile work station having wheeled means associated therewith for ease of movement of the mobile work station at the job site; providing a rigid handle attached to the mobile work station such that the painter may grasp the handle for pushing or pulling the mobile work station around the job site; disposing the paint pan in the compartment in the mobile work station such that the shallow end of the paint pan is adjacent to the handle and the deep end of the paint pan is away from the handle; providing paint and pouring the paint into the paint pan; dipping the paint applicator into the paint in the deep end of the paint pan, removing excess paint at the shallow end of the paint pan and applying paint to the work surfaces; repeating the dipping of the paint applicator into the paint and applying the paint to the work surface; completing the application of paint to the work surface; pushing or pulling the handle to move the mobile work station to the next work surface such that spilling of paint is prevented and without requiring the lifting of the paint pan by the painter; repeating the dipping of the paint applicator into the paint, applying paint to the work surface and moving the mobile work station by pushing or pulling the handle and without requiring unnecessary movement by the painter around the job site or around the mobile work station, thereby enhancing the speed, quality and efficiency of the work being performed by the painter while simultaneously reducing painter fatigue on the job.

2. A method of progressively painting on a work surface on a job site, wherein a painter uses a roller paint applicator and a paint pan, the paint pan having a shallow end and a deep end, the method comprising the steps of: providing a foldable, portable, mobile work station; the work station having a tray means to receive the paint pan; carrying the mobile work station to the job site; the mobile work station having a collapsed and an erected position facilitated by a plurality of pivotable legs, such that the legs are folded adjacent to the tray means within the mobile work station in its collapsed position, and such that the legs depend downwardly from the mobile work station in its erected position; pivoting the legs out of the mobile work station to erect the mobile work station; the mobile work station being substantially rectangular and in a horizontal plane, when erected, and including four corners, and the plurality of pivotable legs comprising four legs which depend vertically downwardly from the tray means substantially from the respective four corners thereof, such that the legs are perpendicular to the plane of the mobile work station, and the mobile work station thereby having improved stability for moving the mobile work station around the job site, the legs having end portions provided with caster means, such that the mobile work station may be conveniently moved around the job site; disposing the paint pan in the tray means, so that the paint pan is at a convenient elevated height above the floor, and so that the painter may apply paint to the paint applicator without repeatedly deep bending, thereby reducing painter fatigue; providing a handle on the mobile work station, the handle being disposed between the painter and the mobile work station, and further being disposed adjacent to the shallow end of the paint pan and remote from the deep end of the paint pan, such that the painter may grasp the handle for pushing or pulling the mobile work station around the job site; providing paint and pouring the paint into the paint pan; disposing the mobile work station such that the mobile work station is in front of the painter and spaced apart laterally from the work surface, such that the handle is adjacent to the painter for the painter's convenient grasp, and such that the elevated paint pan on the mobile work station is oriented substantially parallel to the work surface and longitudinally relative to the painter with the shallow end of the paint pan near the painter and the deep end of the paint pan away from the painter, wherein the painter may turn approximately 90° from the mobile work station to the work surface; dipping the paint applicator into the paint in the deep end of the elevated paint pan, removing excess paint at the shallow end of the elevated paint pan and applying paint to the work surface; repeating the dipping of the paint applicator into the pan and applying the paint to the work surface; completing the application of paint to the work surface; pushing or pulling the handle to move the mobile work station to the next work surface, such that spilling of paint is prevented and without requiring the lifting of the paint pan by the painter; and repeating the dipping of the paint applicator into the paint pan, applying paint to the work surface, and moving the mobile work station by pushing or pulling on the handle without requiring unnecessary movement by the painter around the job site or around the mobile work station, thereby enhancing the speed, quality and efficiency of the work being performed by the painter while simultaneously reducing painter fatigue on the job.

* * * * *